US006371304B2

(12) United States Patent
Gambini

(10) Patent No.: US 6,371,304 B2
(45) Date of Patent: Apr. 16, 2002

(54) DEVICE FOR THE SELECTION AND ELIMINATION OF CROP ENDS OF ROLLS OF KITCHEN TOWEL AND/OR TOILET PAPER

(76) Inventor: Giovanni Gambini, Via A. Omodeo 7 - I - 56100, Pisa (IT)

( * ) Notice: Subject to any disclaimer, the term of this patent is extended or adjusted under 35 U.S.C. 154(b) by 0 days.

(21) Appl. No.: 09/815,532

(22) Filed: Mar. 14, 2001

(30) Foreign Application Priority Data

Mar. 17, 2000 (IT) ........................................ MI00A0563

(51) Int. Cl.[7] ............................ B07C 5/06; B65G 15/12

(52) U.S. Cl. ........................ 209/620; 209/621; 209/622; 198/626.1

(58) Field of Search ................................ 209/698, 540, 209/544, 701, 707, 681, 620, 621, 622, 623, 922; 198/626.1, 398

(56) References Cited

U.S. PATENT DOCUMENTS

| | | | | |
|---|---|---|---|---|
| 822,105 A | * | 5/1906 | Eklund | 209/700 |
| 4,265,361 A | * | 5/1981 | Schroeder | 209/617 |
| 4,789,055 A | * | 12/1988 | Steurmer | 198/425 |
| 5,458,033 A | * | 10/1995 | Wierschke | 83/104 |
| 5,475,917 A | * | 12/1995 | Biagiotti | 29/822 |

FOREIGN PATENT DOCUMENTS

| | | | |
|---|---|---|---|
| JP | 40-6015599 A | * | 1/1994 |

* cited by examiner

*Primary Examiner*—Christopher P. Ellis
*Assistant Examiner*—Joseph C Rodriguez
(74) *Attorney, Agent, or Firm*—Hedman & Costigan

(57) ABSTRACT

A device for the selection and elimination of crop ends of rolls of kitchen towel and/or toilet paper, in which the device is supplied by at least one row of finished rolls (12) and by top and tail crop ends (13) cut in sequence from at least one log, and including a structure (14) supporting an upper belt unit (16) and a lower belt unit (15*a*, 15*b*), facing each other to receive the rolls (12) and crop ends (13), the lower belt unit (15*a*, 15*b*) having a first, belt subunit (15*a*) and a second belt subunit (15*b*) separated by an opening (26), upstream the first belt subunit (15*a*) with a fixed lower surface (32) underneath the upper belt unit (16) to turnover the crop ends (13) and with a contact means (33, 35) being provided a the entrance of opening (26), on the turned crop ends to rotate them into the opening (26), letting the cut and finished rolls (12) pass by.

9 Claims, 3 Drawing Sheets

DEVICE FOR THE SELECTION AND ELIMINATION OF CROP ENDS OF ROLLS OF KITCHEN TOWEL AND/OR TOILET PAPER

BACKGROUND OF THE INVENTION

1. Field of the Invention

The present invention refers to a device for the selection and elimination of crop ends of rolls of kitchen towel and/or toilet paper.

In the production sector of rolls of kitchen towel and/or toilet paper, for example, it is known to begin with wound rolls of a predetermined diameter and of a certain height, e.g. approximately two meters, and then proceed with the production of single rolls, e.g. starting with approx. 200 mm in length, ready for distribution.

This operation is carried out on special cropper machines which receive, for example, the single roll, known as a log, and which is cut in sequence into a large number of rolls, each of the required size.

In addition to obtaining a certain number of rolls from each single roll or log, a certain quantity of top and/or tail logs, known as crop ends are produced which must be eliminated. Both the cut and finished rolls as well as the crop ends are made to advance on a conveyor, usually of push type, used for the evacuation of the finished rolls.

Various methods and devices have been proposed which allow, in some way, the separation of these crop ends left over from the initial roll or log. However, the known devices present the problem of having difficulty in eliminating the crop ends which tend to cause unloading problems and remain on the conveyor.

2. Description of the Related Art

Moreover, there are basically two types of elimination systems in current use: the first works by the suction of just the rolls and not the crop ends, and a second which works by the maintenance of just the rolls using special mechanical grasping parts. Both systems must be adjusted to suit the rolls being processed; besides, the first case has suction difficulties with an increase in the weight of the single rolls. In the second case, the mechanical parts mark the roll surface which results in a poor quality product.

The aim of the present invention is to produce a device for the selection and elimination of these crop ends which are generated in a cropper machine and which must be separated from the rolls of kitchen towel and/or toilet paper which are cut to the required size, selected and transported one after the other.

Another aim of the present invention is to produce an extremely simple and practical device which ensures the elimination of log crop ends, whatever their size.

These and other aims, according to the present invention, are reached by producing a device for the selection and elimination of crop ends of rolls of kitchen towel and/or toilet paper as shown in claim 1.

Further characteristics are envisaged in the dependent claims.

BRIEF DESCRIPTION OF DRAWINGS

The characteristics and advantages of a device for the selection and elimination of crop ends of rolls of kitchen towel and/or toilet paper, according to the present invention, will become more apparent from the following description, provided by way of non-limiting example with reference to the attached schematic drawings, in which.

DETAILED DESCRIPTION OF THE PREFERRED EMBODIMENTS

Figure 1:
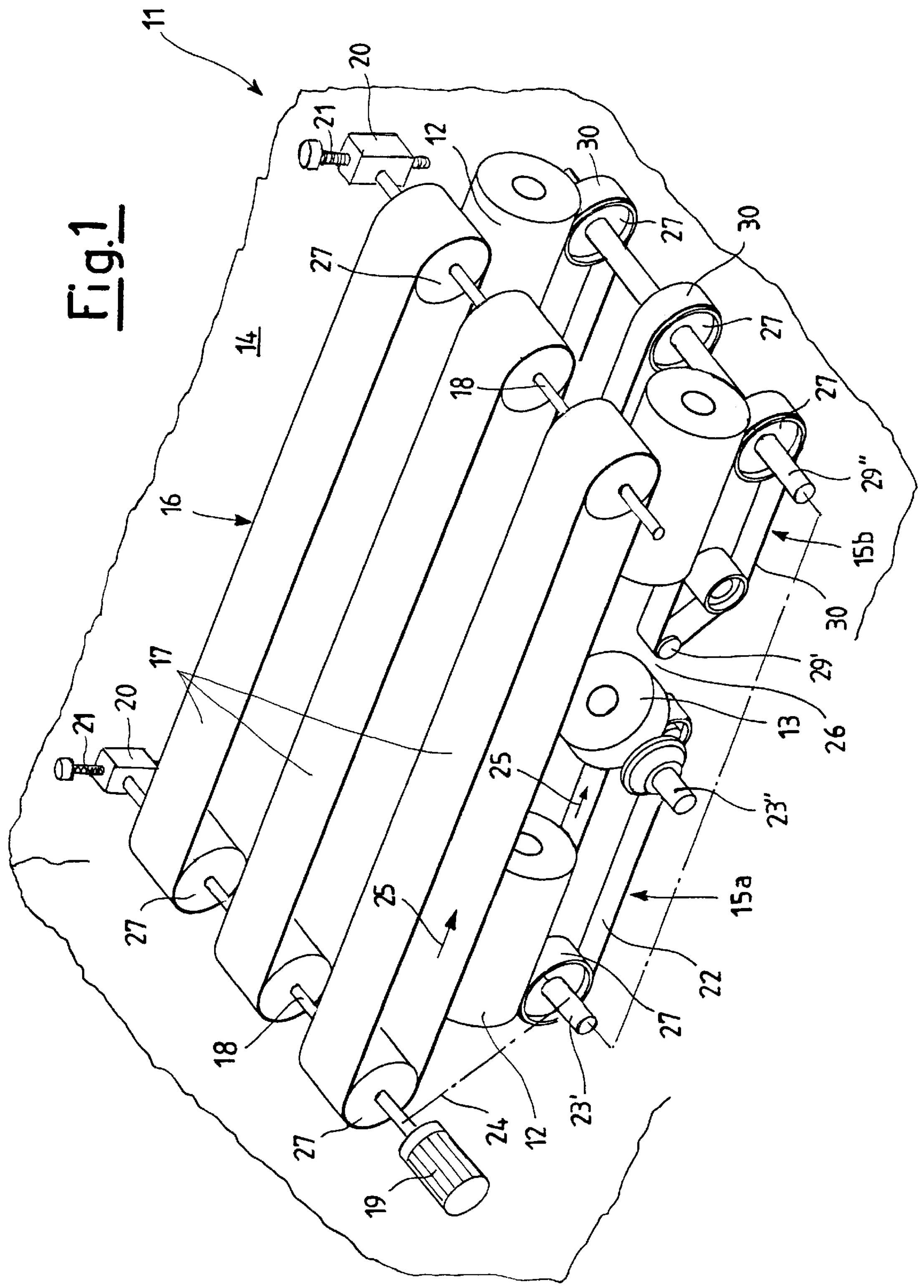
FIG. 1 is a perspective view of a device according to the present invention.

With reference to the figures, a device for the selection and elimination of crop ends of rolls of kitchen towel and/or toilet paper denoted, as a whole, by 11, which in general can be combined with a cropper machine.

The device is positioned below a cropper machine of one or more logs (not shown and in itself known) and is supplied in sequence by rows of finished rolls 12, in addition to top and tail crop ends 13 of the cut log. The example shows a device in which it is possible to receive, simultaneously and in parallel, three logs divided into rolls 12.

The device basically includes, on a fixed supporting structure, e.g. consisting of two side frames, only one of which is partially shown in 14, a fixed lower belt unit 15*a* and 15*b* and a moving upper belt unit 16, movable vertically in relation to the lower belt unit 15*a* and 15*b*.

The moving upper belt unit 16 has belts 17, for example three, ring wound between two end shafts 18 carrying pulleys 27 and the first shaft 18 is rotation operated by a motor 19. The ends of shafts 18 are set on movable support plates 20, in relation to shoulders 14, by means of a screw-nut screw system 21 so as to provide height adjustment in relation to the lower belt unit 15*a* and 15*b*. The plates 20 are on both shoulders 14, but FIG. 1 only shows one side. This lower belt unit has a first lower belt subunit 15*a*, with belts 22, these also being set around end shafts 23' on one side and 23" on the other, bearing pulleys 27 and 28. The first shaft 23' draws motion through a transmission 24 from the upper belt unit 16.

After a short empty section under the upper belt unit 16, which defines an opening 26, clearly visible in FIG. 1, the second lower belt subunit 15*b* is set, in which belts 30 are also arranged between end shafts 29' and 29", the second of which 29" draws motion from the first lower belt subunit 15*a*.

Naturally the belts define a run in which the finished rolls 12 and the crop ends 13 are transported. For this purpose, the sections facing the belts 17, 22, and 30 move in the same direction a, arrow 25, so as to enclose and advance the rolls 12 and also the crop ends 13.

Continuous lateral guides 31 are arranged opposite each of the lower belts 22 and 30 which keep the rolls 12 in line above the belts, guiding them sideways on their run between the upper belt unit 16 and the lower belt unit 15*a* and 15*b*. It should be noted that the upper belt unit 16 faces the exit of the cropper conveyor (not shown) before the first lower belt subunit 15*a*. In addition, the linear advancement speed of belts 17, 22 and 30 is greater than the advancement speed of the push conveyor of the cropper, so as to be able to move the rolls 12 and crop ends 13 away from each other which, in the cropper conveyor, are pushed from behind by the pusher and hence are joined to each other.

Therefore it must be noted that in order to complete the run of rolls 12 and crop ends 13, a lower fixed surface 32 is set at the cropper conveyor exit, underneath and facing the initial part of the upper belt unit 16. In this way the rolls 12 and crop ends 13 are always guided during their advancement. The collaboration between the upper belts 17 and the lower fixed surface 32 causes the turnover of crop ends 13 which, at the lower belt 22 entrance first subunit 15, are set down on it and hence turned over are transported by the lower belt 22.

Near the end part of belts 22, alongside the belts and before opening 26, are located a pair of flanges 33, transversally and at opposite parts of each belt 22, on the upper shaft 23", which bears the pair of pulleys 28.

These flanges 33, on faces 34 turned inwards towards the upper branch of belt 22 are equipped with a rubbery material, for example an O-ring 35. This O-ring 35 thus engages with the external sides of the incoming crop ends 13 turned over so as to occupy the entire belt.

This O-ring 35 or rubbery material jams the crop end 13, engaging with its sides, and drags it in a downwards rotary motion into opening 26, unloading it from belt 22. Hence a contact means (33, 35) is produced on the turned crop ends 13 to rotate them into the opening 26 which, in any case, lets the cut and finished rolls 12 pass.

Figure 3:
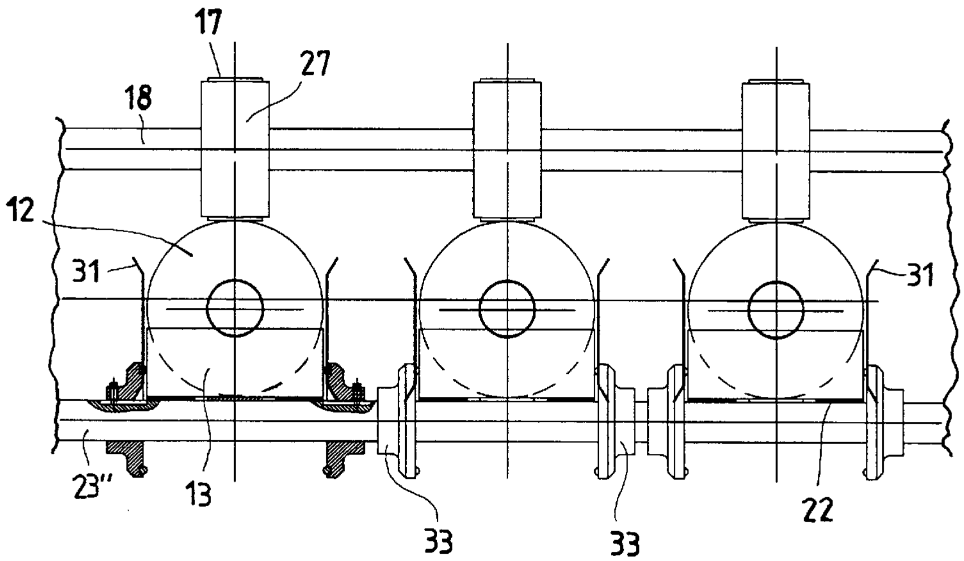
FIG. 3 is a front view from one end of the invention device.
Figure 4:
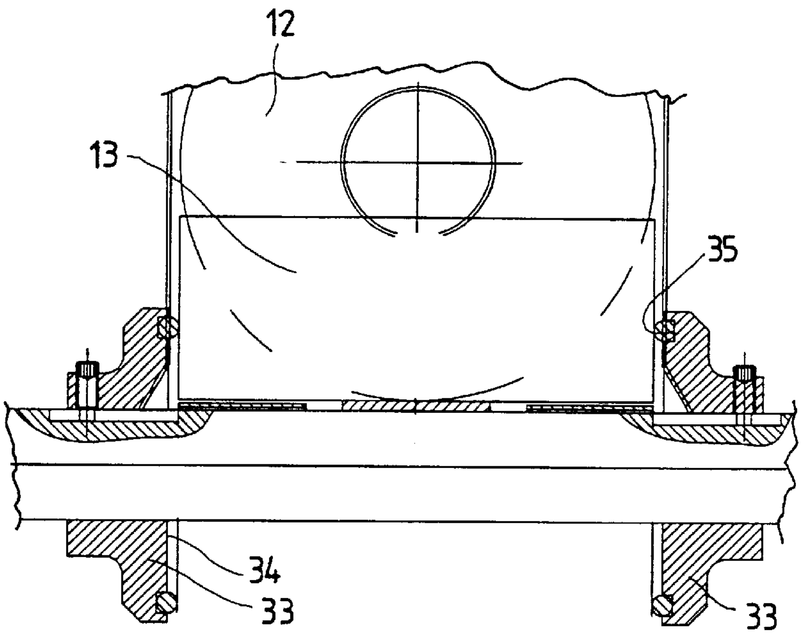
FIG. 4 is an enlarged, partially sectioned, view of a detail of FIG. 3.

In fact, the rolls 12, as clearly visible in FIG. 3, do not engage with the rubbery material 35 and are dragged, enclosed between the belts 17 and 22 above opening 26, moving above belts 30 of the second lower belt subunit **15*b*** and continuing their advancement.

It must be noted that the size of opening 26 can be adjusted, for the passing of short rolls 12, by any mechanical, pneumatic or electrostatic maintenance system of the short rolls while crossing the same opening 26.

Figure 2:
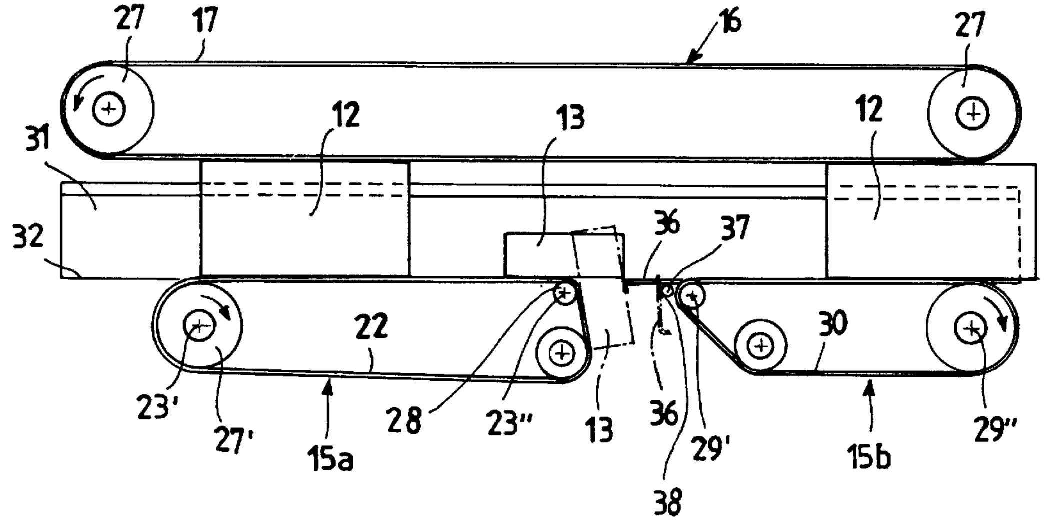
FIG. 2 is a side elevation view of the device in FIG. 1.

FIG. 2 shows an example of how the opening 26 can be be mechanically limited in its size by a tongue 36, pivoted in 37 to an end in the initial part of belts 30 of the second lower belt subunit **15*b***.

Figure 5:
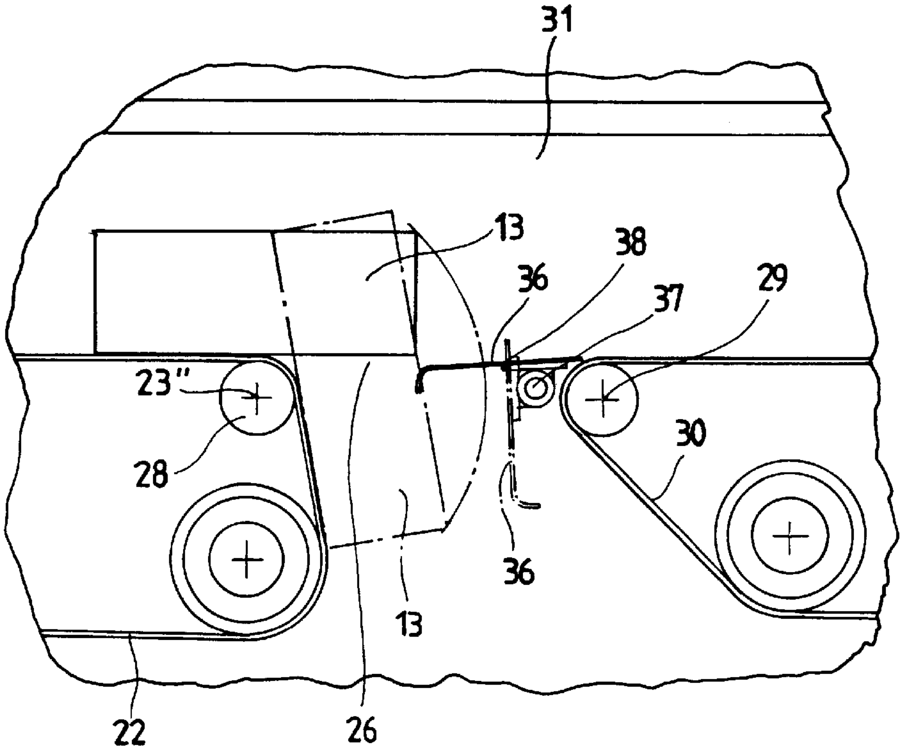
FIG. 5 is an enlarged view of a detail of FIG. 2.

The tongue 36 is normally kept raised by a spiral spring 38 so as to limit the size of the opening 26. In fact an opening 26, reduced in size by tongue 36 is useful to receive and eliminate the crop ends of toilet paper rolls 12, i.e. of short size, and to ensure the passing of rolls 12 of the toilet paper itself. On the contrary, when rolls of kitchen towel are handled with longer axial dimension, the tongue 36 can be turned downwards to eliminate such bulkier crop ends 13 though anyhow ensuring the passing of rolls 12. In fact, spring 38 is able to yield if stressed by crop ends which are enclosed and rotationally dragged by the flanges 33, but prevents the rotation of tongue 36 when a roll 12, passing above it, is dragged into contact with belts 17, 22 and 30 of the device (FIG. 5).

Although the operation of the device is extremely simple and evident from that so far described, it will be briefly outlined as follows.

As has been said, the logs are cut into equal portions in the cropper, resulting in top and tail crop ends. Hence lined up, one after the other, the rolls 12 and crop ends 13 are set going by a push-conveyor joined to the cropper in the device of the present invention.

The top crop end 13 meets the upper belt unit 16 and the fixed lower surface 32. The friction on the fixed plane of the crop end 13 in collaboration with the advancement of belts 17 causes the turnover of the same crop end 13. In addition, due to the linear advancement speed of the cited belts 17 and the belts 22 of lower belt subunit **15*a* and 1*b*, greater compared to the linear evacuation speed of the conveyor joined to the cropper, both the crop ends 13 as well as rolls 12** move away from each other.

The crop ends 13 thus advance transported only by the belts 22 until the evacuation area at opening 26. Having reached here, the crop ends 13, engage with the flanges 33, enclosed by the O-rings 35 and are forced to rotate into the opening 26 so as to be unloaded downwards. Such flanges, however, do not interfere with the rolls 12 in advancement which are able to continue between the belts 17 and the successive belts 30.

As said previously, in the area of opening 26, in the case of long rolls, i.e. kitchen towel, the rolls are simply enclosed between the upper belts 17 and the lower belts 22 and 30 due to their length; there is no danger that the roll accidentally drops into the opening 26.

In the case of short rolls, i.e. toilet paper, the holding of rolls during the surmounting stage of opening 26 is helped by the presence of tongue 36, kept in position by spring 38 which is calibrated so as to stand the roll weight, but to yield to rotation when put under strain by the engaged crop end and pushed by flanges 33.

The crop ends 13 are then conveyed outside the device by an evacuation belt, not shown, while the rolls 12 continue towards packaging below the device.

A device, according to the present invention, thus solves all the problems of the previous technique and allows, in a reliable and simple way, the handling of both rolls as well as crop ends without any problems, resulting in high productivity of the roll manufacturing equipment.

Advantageously, it must be noted that should the diameter of the logs or cut rolls vary, it is possible to adjust the distance between the facing belts 17, 22 and 30. In fact, it has been said that the upper belt unit 16 is mobile, i.e. movable vertically in relation to the lower belt unit **15*a* and 15*b*. Adjusting the screw-nut screw system 21 on the fixed structure or on the two side frames 14 it is possible to vary the distance, as required, between the moving upper belt unit 16, or belts 17, and the fixed lower belt unit 15*a* and 15*b*, or belts 22 and 30**, changing the distance to match the diameter of logs being treated.

What is claimed is:

1. A device for the selection and elimination of crop ends of rolls of kitchen towel and/or toilet paper, said device being supplied by at least one successive row of finished rolls (12) and cut top and tail crop ends (13) of at least one log, characterized by a fixed structure (14), supporting an upper belt unit (16) and a lower belt unit **(15*a* and 15*b*), facing each other to receive said rolls (12) and crop ends (13), said lower belt unit (15*a* and 15*b*) having a first lower belt subunit (15*a*) and a second lower belt subunit (15*b*), separated by an opening (26) capable of receiving crop ends from a pathway created by said upper and lower belt units, contact with the finished rolls and crop ends along said pathway by a flange (33), one on each side of a belt (22) located between the upper and lower belt units, at the end of a first lower belt subunit (15*a*) immediately before said opening (26) that separates the first lower belt subunit and second lower belt subunit and carried by a shaft (23") bearing a winding pulley (28) of said belt (22), said flanges (33) on faces (34) turned inwards towards an upper branch of said belt (22), being equipped with a rubbery material (35) that engages with the external sides of a crop end (13) causing it to rotate down and enter said opening (26), letting the cut and finished rolls (12)** pass.

2. A device as in claim 1, characterized in that said rubbery material consists of an O-ring (35).

3. A device as in claim 1, characterized in that an upper belt unit (16) is movable vertically in relation to a lower belt unit **(15*a*, 15*b*)**, to accommodate paper rolls with various diameters.

4. A device as in claim 1, characterized in that an upper belt unit (16) and a lower belt unit (15*a*, 15*b*), connected by a transmission (24) which is engaged by a motor, rotates each unit (16, 15*a*, 15*b*) and its corresponding belt (17, 22, 30) in a unilateral direction (25), so as to enclose and advance the rolls (12) and crop ends (13) in said direction.

5. A device as in claim 1, characterized in that said opening (26) between a first lower belt subunit (15*a*) and a second lower belt subunit (15*b*), is limited in size, for the passing of short rolls (12), by any mechanical, pneumatic or electrostatic maintenance system (36) of the short roll (12) while crossing said opening (26).

6. A device as in claim 1, characterized in that an opening (26) between a first lower belt subunit (15*a*) and a second lower belt subunit (15*b*), is limited in size by a tongue (36), pivoted (in 37) to an end in an initial part of said second lower belt subunit (15*b*) and normally kept raised by a spiral spring (38).

7. A device as in claim 6, characterized by an opening (26) reduced in size by a tongue (36) which accepts and let pass, crop ends of various sizes as contact is made by a crop end (13) as it is rotated through said opening and able to overcome the elastic load of said spring (38).

8. A device as in claim 1, characterized by a plurality of lateral guides (31) placed laterally between belts (22, 30) of a first and second lower belt subunits (15*a*, 15*b*), which hold advancing rolls (12) in line with said belts (22, 30).

9. A device as in claim 8, characterized in that there is a plurality of upper and lower belts (17, 22, 30) which can advance a plurality of rolls (12) and crop ends (13) to be separated once received from a multiple cropper machine.

* * * * *